United States Patent
Ansaloni

(12) 
(10) Patent No.: US 6,189,676 B1
(45) Date of Patent: Feb. 20, 2001

(54) ORIENTING ASSEMBLY FOR ORIENTING TOP OR BOTTOM SHELLS OF MEDICINAL CAPSULES, AND RELATIVE SUPPLY AND ORIENTING UNIT

(75) Inventor: Angelo Ansaloni, Crespellano (IT)

(73) Assignee: MG2 S.p.A, Pian di Macina-Pianoro (IT)

( * ) Notice: Under 35 U.S.C. 154(b), the term of this patent shall be extended for 0 days.

(21) Appl. No.: 09/304,339

(22) Filed: May 4, 1999

(30) Foreign Application Priority Data

May 4, 1998 (IT) .............................. BO98A0277

(51) Int. Cl.[7] .................................................. B65G 47/24
(52) U.S. Cl. ............................................ 198/399; 414/755
(58) Field of Search .............................. 198/399; 414/755

(56) References Cited

U.S. PATENT DOCUMENTS

| | | | |
|---|---|---|---|
| 3,917,055 | * 11/1975 | Vandenberg et al. | 198/399 |
| 4,394,933 | * 7/1983 | Ackley | 221/173 |
| 4,479,573 | * 10/1984 | Ackley et al. | 198/399 |
| 4,708,233 | * 11/1987 | Nomura | 198/399 |
| 5,133,636 | * 7/1992 | Hunt et al. | 414/755 |
| 5,503,515 | * 4/1996 | Moorehead | 414/755 |

FOREIGN PATENT DOCUMENTS

| | | | |
|---|---|---|---|
| 228232 | * 10/1985 | (DE) | 198/399 |
| 211213 | * 9/1986 | (JP) | 198/399 |
| 1720833 | * 3/1992 | (SU) | 198/399 |

\* cited by examiner

*Primary Examiner*—Thomas J. Brahan
(74) *Attorney, Agent, or Firm*—Finnegan, Henderson, Farabow, Garrett & Dunner L.L.P.

(57) ABSTRACT

An orienting assembly for medicinal capsules; the orienting assembly being characterized by having a rotary drum having seats, each for housing a top or bottom shell oriented in one of two opposite spatial directions; and by having a nozzle for generating compressed air jets, so that, if the top or bottom shell is oriented with the convexity facing the nozzle, the initial position of the top or bottom shell remains unchanged; whereas, if the top or bottom shell is oriented with the concavity facing the nozzle, the top or bottom shell is inverted by the compressed air jet generated by the nozzle; the invention also relating to a supply and orienting unit featuring the above orienting assembly.

35 Claims, 3 Drawing Sheets

ORIENTING ASSEMBLY FOR ORIENTING TOP OR BOTTOM SHELLS OF MEDICINAL CAPSULES, AND RELATIVE SUPPLY AND ORIENTING UNIT

The present invention relates to an assembly for orienting top or bottom shells of medicinal capsules; and to a supply and orienting unit featuring said orienting assembly.

BACKGROUND OF THE INVENTION

As is known, medicinal capsules normally comprise a substantially cup-shaped bottom shell; a top shell for closing the bottom shell; and a given quantity of drug enclosed inside the bottom shell. The top and bottom shells are normally made of hard gel, which is rapidly dissolved by gastric acids to release the enclosed drug within a controlled length of time.

Currently used machines for producing medicinal capsules receive the drug and the empty capsules separately at the input, and supply, at the output, a succession of capsules containing a predetermined quantity of drug.

Such machines normally comprise a pocket conveyor for feeding a succession of capsules along a path extending through a supply station where the empty capsules are oriented and inserted successively inside the pockets on the conveyor; a parting station where each top shell is detached from the respective bottom shell to open the capsule; a cleaning station where any processing residue is removed from inside each bottom shell; a dispensing station where a predetermined quantity of drug is fed into each bottom shell; a closing station where each top shell is put back onto the respective bottom shell; and, finally, a pickup station where the medicinal capsules are removed off the pocket conveyor and sent to a packing unit.

The marketing of new types of controlled-release medicinal capsules, however, now calls for supplying production machines separately with the drug and the top and bottom shells. To do this, various units for orienting and supplying top shells have been devised, but which are relatively complex and fail to provide for a sufficiently high hourly output rate.

SUMMARY OF THE INVENTION

It is an object of the present invention to provide an orienting assembly and relative orienting unit for orienting top or bottom shells of medicinal capsules, and which are straightforward and cheap to produce, and provide for a higher hourly output rate than at present.

According to the present invention, there is provided an orienting assembly of a supply and orienting unit for top or bottom shells of medicinal capsules; the orienting assembly receiving, at the input, a succession of single top or bottom shells, each oriented in either of two opposite spatial directions; the orienting assembly supplying, at the output, a succession of equioriented single top or bottom shells; and the orienting assembly being characterized by comprising a rotary drum having a number of seats, each for housing a top or bottom shell oriented in one of the two opposite spatial directions; and by comprising pneumatic means such that, if the convexity of said top or bottom shell is oriented facing said pneumatic means, the top or bottom shell, even though subjected to the action of a stream of compressed air produced by said pneumatic means, remains housed inside the respective seat, whereas, conversely, if the concavity of said top or bottom shell is oriented facing said pneumatic means, said top or bottom shell is transferred, by virtue of the action of said stream of compressed air produced by said pneumatic means, from the respective seat in which the top or bottom shell is housed to a temporary parking device by which the top or bottom shell is reinserted inside the respective seat; the top or bottom shell, once reinserted inside the respective seat, having a direction of orientation opposite with respect to the initial direction of orientation.

It is a further object of the present invention to combine such an orienting assembly in a novel manner with a new type of supply assembly, to achieve a supply and orienting unit of original design.

The main advantage of the orienting assembly according to the present invention lies in it being based on a straightforward fluid dynamic principle, and on the characteristics inherent in the shape of the top or bottom shell. Which straightforward fluid dynamic principle provides for eliminating complex known-state-of-the-art systems normally involving the use of photocells for determining the orientation direction of the top or bottom shell, so that, given a first reference orientation direction, any top or bottom shells already oriented in the first direction are left so oriented, and any top or bottom shells oriented in a second direction opposite the first reference orientation direction are re-oriented in the first direction.

Though the following detailed description refers explicitly to an assembly for orienting top capsule shells, the same assembly, with appropriate alterations, may obviously also be used for orienting bottom shells.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
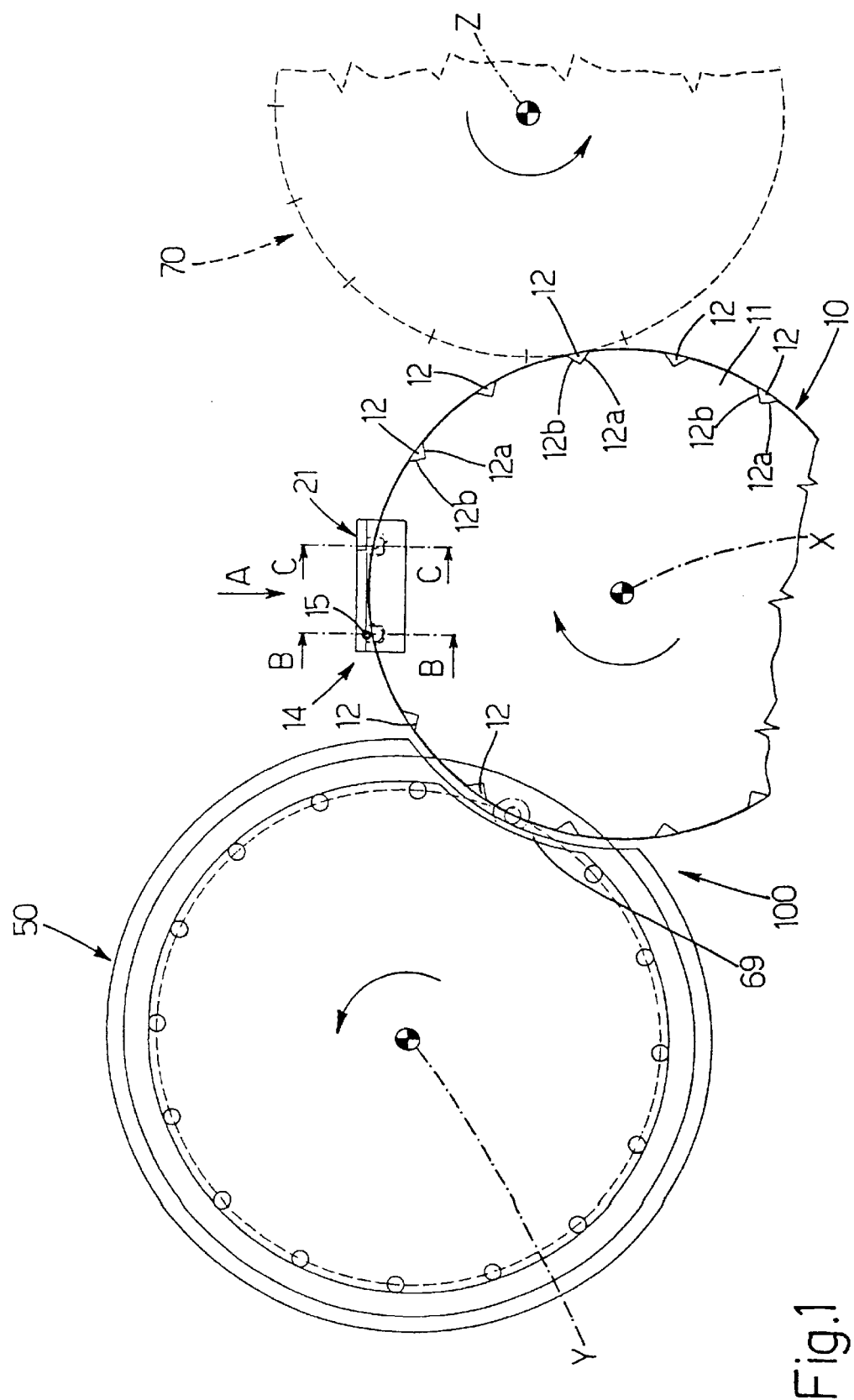
FIG. 1 shows, schematically, the orienting assembly according to the present invention combined with a supply assembly and a closing assembly.

FIG. 1 shows an orienting assembly 10, in accordance with the present invention, located between a supply assembly 50 and a closing assembly 70.

Orienting assembly 10 and supply assembly 50 together combine to form a supply and orienting unit 100 of original design.

As explained in more detail later on, orienting assembly 10 receives in succession a number of top shells 2 (FIGS. 2–5) supplied by supply assembly 50, and provides for spatially arranging top shells 2 so that top shells 2 are all fed to closing assembly 70 with the same spatial orientation. At closing assembly 70, each top shell 2 is fitted in known manner to a complementary bottom shell—filled beforehand with the desired drugs—to form a complete capsule (FIG. 5).

Figure 4:
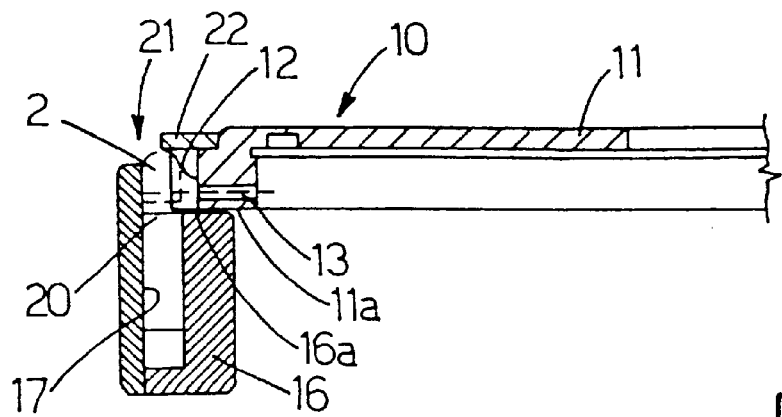
FIG. 4 shows a section along line C—C of the FIG. 1 orienting assembly.
Figure 5:
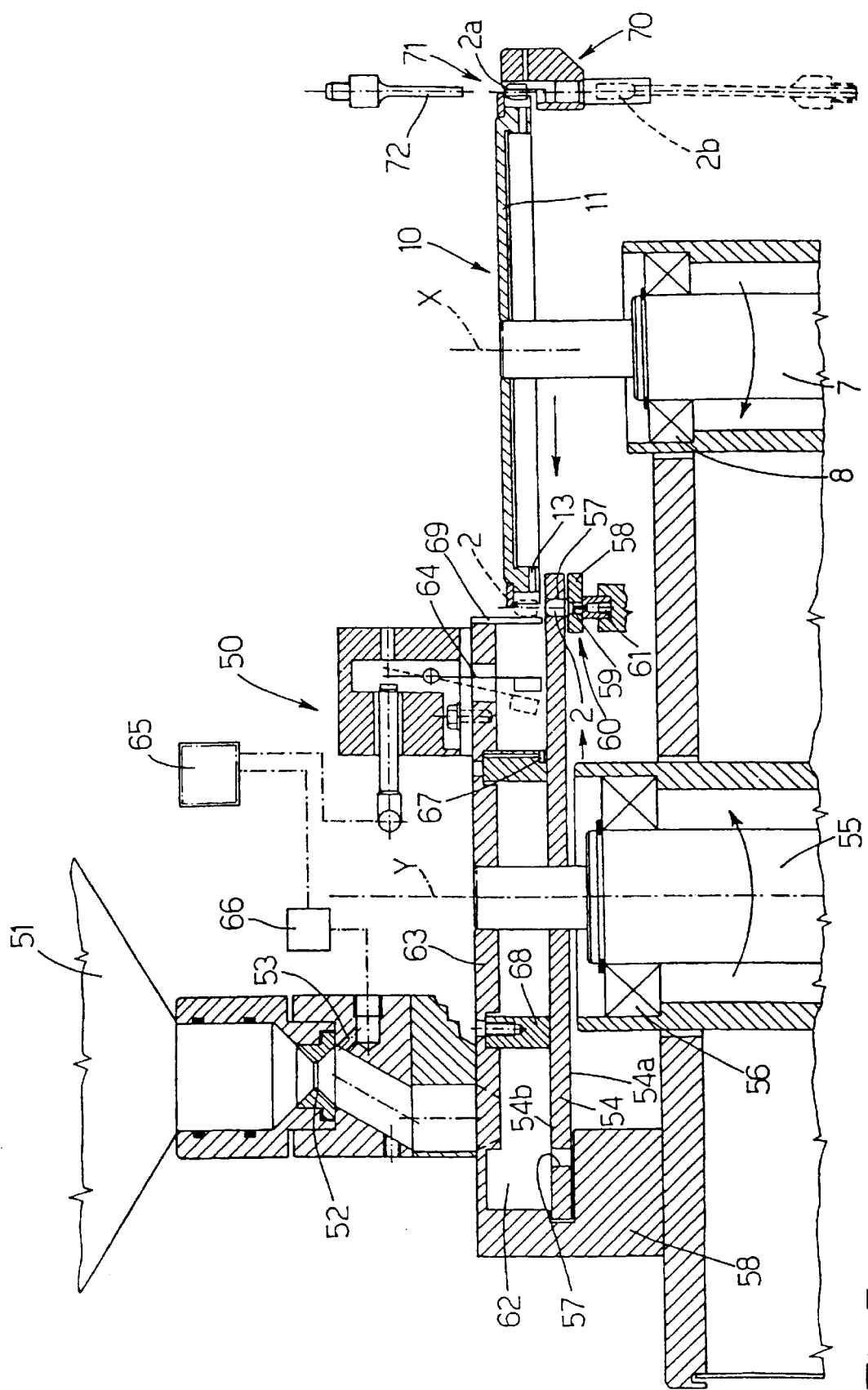
FIG. 5 shows, schematically, the FIGS. 1–4 orienting assembly combined with a supply assembly; the orienting assembly and supply assembly forming a supply and orienting unit constituting a further object of the present invention.

The orienting assembly 10 shown in the accompanying drawings comprises a drum 11, which is rotated about an axis X by a motor (not shown) for driving a shaft 7 supported by a bearing 8 (FIG. 5). Drum 11 comprises a number of peripheral seats 12 formed by the intersection of two perpendicular walls 12a and 12b (FIGS. 1, 2); and, by means of pneumatic means (not shown), a hole 13 (FIGS. 3–5) at the right-angle intersection of walls 12a and 12b provides for retaining and releasing top shell 2 in and from seat 12.

Figure 2:
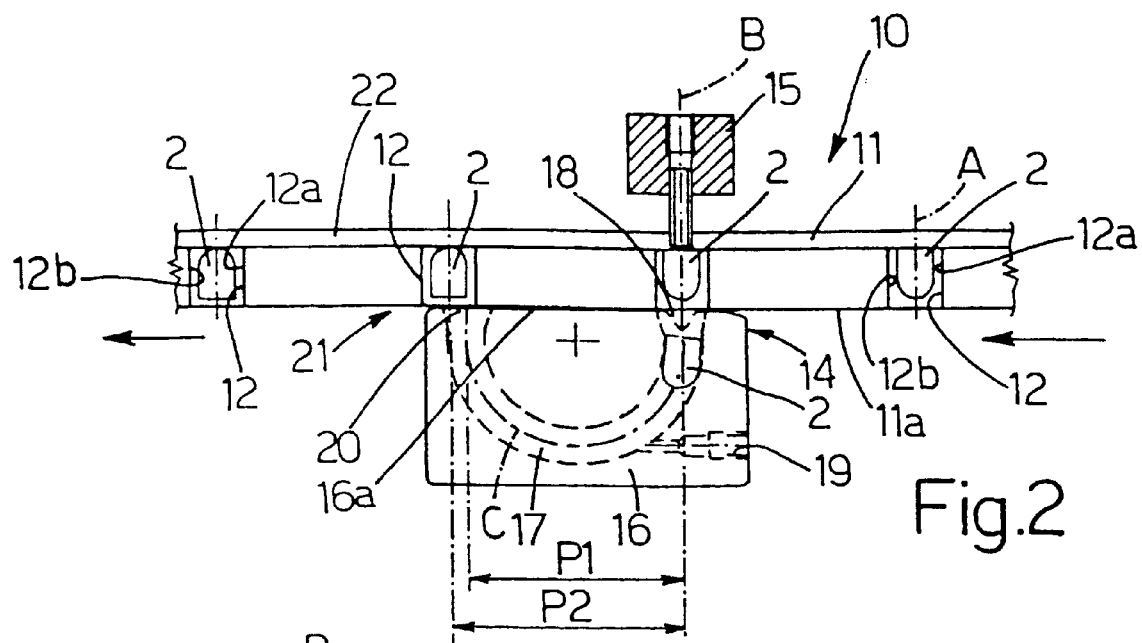
FIG. 2 shows a view A of parts of the orienting assembly according to the present invention.
Figure 3:
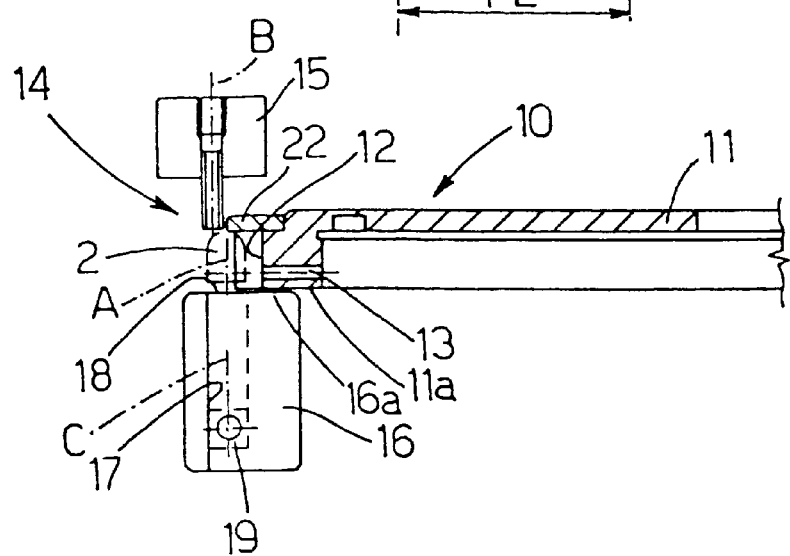
FIG. 3 shows a section along line B—B of the FIG. 1 orienting assembly.

As shown in FIGS. 1–4, at a removal station 14 for removing top shell 2 from respective seat 12, a nozzle 15 is positioned with the outlet facing drum 11, in particular the peripheral portion of drum 11 comprising seats 12, each for housing a top shell 2 supplied by supply assembly 50 (FIGS. 1 and 5). As shown in FIG. 3, top shell 2 projects slightly from the outer edge of drum 11, and has an axis A slightly offset with respect to axis B of nozzle 15. A fixed block 16 facing the bottom surface 11a of drum 11 has a substantially semicircular channel 17 with a substantially square cross section; the longitudinal axis of symmetry C of channel 17 may be considered an ideal continuation of axis A of bottom or top shell 2; and the transverse dimensions of channel 17 are compatible with those of top shell 2. Channel 17 also comprises an inlet 18 having a substantially square initial cross section, which gradually blends with said square cross section of the actual channel 17. At the bottommost part of channel 17, there is provided a further nozzle 19 by which the top shell 2 traveling along channel 17 is blown towards an outlet 20 in the same upper face 16a of block 16 facing the bottom face 11a of drum 11. An important characteristic of assembly is that the pitch $P_1$ of channel 17, i.e. the distance between the respective axes of inlet 18 and outlet 20, is slightly less than the pitch $P_2$ representing the distance between the respective axes of two consecutive seats 12, so that top shell 2 blown by the compressed air jets produced by nozzles 15 and 19 rests on the bottom surface 11a of drum 11 long enough to allow seat 12 to be rotated by drum 11 up to a reinsertion station 21. As it travels along channel 17, top shell 2 is therefore inverted spatially, in the sense that the spatial direction occupied by top shell 2 at reinsertion station 21 is exactly the opposite to that occupied by the same top shell 2 at removal station 14. Obviously, once inverted, top shell 2 is reinserted into the same seat 12 occupied previously.

Operation of the orienting assembly according to the present invention is characterized in that, if the convexity of top shell 2 is positioned facing the compressed air jet produced by nozzle 15, as shown in FIG. 3, the compressed air jet has no effect on, and slides so to speak over the outer surface of, top shell 2, thus failing to insert the top shell through inlet 18 into channel 17. Conversely, if top shell 2 is positioned with the concavity facing the jet produced by nozzle 15 (FIG. 2, for example), the force of the compressed air entering top shell 2 is sufficient to blow top shell 2 through inlet 18 into channel 17. And only in this case is top shell 2 inverted as described above.

As such, the mechanism by which only the top shells 2 oriented with the concavity facing the compressed air jet produced by nozzle 15 are inverted is based on a straightforward fluid dynamic principle, and on the characteristics inherent in the shape of top shell 2. Which straightforward fluid dynamic principle provides for eliminating complex systems normally involving the use of photocells for determining the orientation direction of the top shell, so that, given a first reference orientation direction, any top shells already oriented in the first direction are left so oriented, and any top shells oriented in a second direction opposite the first reference orientation direction are re-oriented in the first direction.

As shown, for example, in FIGS. 2–4, drum 11 comprises, along the outer edge, a circular rim 22, which substantially provides for arresting the travel of top shell 2 in the event the top shell, being oriented with the convexity facing the compressed air jet produced by nozzle 15, is blown towards reinsertion station 21 where top shell 2 is reinserted inside the same seat 12 vacated shortly before and which, in the meantime, has been rotated by drum 11 from removal station 14 to reinsertion station 21.

Obviously, the above operations are performed extremely rapidly and, particularly as regards the operating time of nozzles 15, 19, the rotation speed of drum 11, the release time of top shell 2 inside seat 12, etc., are conveniently synchronized by an electronic computer not shown in the accompanying drawings.

As shown in FIGS. 1 and 5, top shells 2 are supplied by a supply assembly 50 with the respective concavities facing upwards or downwards at random. Assembly 50 comprises a hopper 51 into which top shells 2 are loaded in bulk and drop by force of gravity into a narrow throat 52, which is clogged by top shells 2, thus temporarily interrupting supply, and which is temporarily cleared by a nozzle 53 for producing pulsating air jets directed towards throat 52. Assembly 50 also comprises a circular plate 54, which is rotated about an axis Y by an electric motor (not shown) via a shaft 55 supported by a bearing 56; circular plate 54 in turn comprises a number of through seats 57, each for receiving a respective top shell 2 which is rotated by circular plate 54 about axis of rotation Y; and the bottom face 54a of circular plate 54 rests on a supporting member 58 having an opening 59 at a transfer station 60. It should be stated that the thickness of circular plate 54 may vary according to the dimensions of top shells 2 being supplied. For which purpose, provision may be made for a set of circular plates 54 comprising a number of circular plates 54 of different thicknesses.

A nozzle 61 is located facing opening 59 to direct compressed air, when commanded, onto the incoming top shell 2 in the through seat 57 conveyed by the rotation of circular plate 54. Which compressed air jet produced by nozzle 61 obviously provides, at transfer station 60, for transferring top shell 2 from the through seat 57 on supply assembly 50 to the seat 12 on drum 11 of orienting assembly 10.

From hopper 51, top shells 2 drop by force of gravity into a gap 62 located between top surface 54b of circular plate 54 and a cover member 63, and in which operates a level sensor 64 for indicating to an electronic central control unit 65 any fall in the level of top shells 2 inside gap 62. Electronic central control unit 65 in turn supplies a signal to a solenoid valve 66, which activates the pulsating compressed air jet produced by nozzle 53 to periodically clear throat 52, when commanded, and so regulate the flow of top shells 2 into gap 62 as required. To move top shells 2 towards the periphery of circular plate 54, provision is made for a number of additional nozzles 67 (only one shown in FIG. 5) spaced a given distance apart on a ring-shaped member 68 integral with cover member 63, and which produce compressed air jets for assisting insertion of top shells 2 into through seats 57.

Supply assembly 50 operates as follows.

(a) Top shells 2 are loaded in bulk by the operator into hopper 51 and drop by force of gravity into gap 62.
(b) As circular plate 54 is rotated by the electric motor via shaft 55, seats 57 each receive a respective top shell 2. The other top shells 2, even though drawn along involuntarily by the rotation of circular plate 54, are retained inside gap 62 by a vertical wall 69 integral with cover member 63, and the bottom edge of which faces, without directly contacting, the top surface 54b of circular plate 54 (see FIG. 5). In other words, vertical wall 69 only lets out the top shells 2 already housed inside respective through seats 57; and the height of wall 69 is obviously selected according to the thickness of circular plate 54, which, as stated, varies according to the dimensions of top shells 2.

(c) At this point, each top shell 2, oriented with the concavity facing upwards or downwards at random (as shown in FIG. 5), is fed to transfer station 60 where the top shell is transferred to orienting assembly 10 by the air jet produced by nozzle 61 facing transfer station 60.

As shown in FIG. 5, in closing assembly 70 at a closing station 71, a top shell 2a, carried by orienting assembly 10, is fitted in known manner to a corresponding bottom shell 2b—supplied by a bottom shell supply assembly (not shown)—by means of a punch 72 moved vertically up and down by actuating means not shown in FIG. 5.

What is claimed is:

1. An assembly for orienting shells of medicinal capsules in a single direction, each shell having a concave inner surface and a convex outer surface, comprising:
    a pneumatic device producing a stream of fluid;
    a rotary drum having a plurality of seats, each seat being configured to hold a single shell either in a first direction having the concave inner surface facing the pneumatic device or in a second direction having the convex outer surface facing the pneumatic device; and
    a block including a channel having an inlet and an outlet, the inlet and the pneumatic device being positioned relative to each other such that, when a seat holding a shell in the first direction aligns with the inlet, the stream of fluid impinges on the concave inner surface and removes the shell from the seat into the inlet, the removed shell being moved through the channel to the outlet where the removed shell is temporarily retained in the second direction to be inserted into the seat when the seat aligns with the outlet, and when a seat holding a shell in the second direction aligns with the inlet, the shell remains in the seat despite the stream of fluid impinging on the convex outer surface.

2. The assembly of claim 1, wherein the distance between the inlet and the outlet is less than the distance between two consecutive seats.

3. The assembly of claim 1, wherein the rotary drum includes a surface to retain the removed shell temporarily at the outlet.

4. The assembly of claim 2, wherein the channel is substantially semicircular between the inlet and the outlet.

5. The assembly of claim 2, wherein the pneumatic device is a nozzle producing a stream of compressed air.

6. The assembly of claim 2, further comprising another pneumatic device producing a stream of fluid to assist the movement of the removed shell through the channel.

7. The assembly of claim 4, wherein said another pneumatic device is a nozzle producing a stream of compressed air.

8. The assembly of claim 2, wherein the axis of the pneumatic device is positioned offset relative to the axis of the inlet.

9. The assembly of claim 2, wherein the rotary drum includes a rim to stop the movement of the removed shell when the removed shell is inserted into the seat from the outlet.

10. An apparatus for supplying shells of medicinal capsules and for orienting the shells in a single direction, each shell having a concave inner surface and a convex outer surface, comprising:
    a supply assembly comprising:
        a rotary plate having a plurality of through seats, each through seat being configured to retain a single shell; and
    an orienting assembly comprising:
        a pneumatic device producing a stream of fluid;
        a rotary drum having a plurality of seats, each seat being configured to align with a corresponding through seat to receive a shell therefrom, each seat being configured to hold a shell received from the rotary plate either in a first direction having the concave inner surface facing the pneumatic device or in a second direction having the convex outer surface facing the pneumatic device; and
        a block including a channel having an inlet and an outlet, the inlet and the pneumatic device being positioned relative to each other such that, when a seat holding a shell in the first direction aligns with the inlet, the stream of fluid impinges on the concave inner surface and removes the shell from the seat into the inlet, the removed shell being moved through the channel to the outlet where the removed shell is temporarily retained in the second direction to be inserted into the seat when the seat aligns with the outlet, and when a seat holding a shell in the second direction aligns with the inlet, the shell remains in the seat despite the stream of fluid impinging on the convex outer surface.

11. The apparatus of claim 10, wherein the distance between the inlet and the outlet is less than the distance between two consecutive seats.

12. The apparatus of claim 11, wherein the rotary drum includes a surface to retain the removed shell temporarily at the outlet.

13. The apparatus of claim 11, wherein the channel is substantially semicircular between the inlet and the outlet.

14. The apparatus of claim 11, wherein the pneumatic device is a nozzle producing a stream of compressed air.

15. The apparatus of claim 11, wherein the orienting assembly includes another pneumatic device producing a stream of fluid to assist the movement of the removed shell through the channel.

16. The apparatus of claim 15, wherein said another pneumatic device is a nozzle producing a stream of compressed air.

17. The apparatus of claim 11, wherein the axis of the pneumatic device is positioned offset relative to axis of the inlet.

18. The apparatus of claim 11, wherein the rotary drum includes a rim to stop the movement of the removed shell when the removed shell is inserted into the seat from the outlet and to stop the movement of a shell when the shell is transferred from a through seat of the rotary plate to a seat of the rotary drum.

19. The apparatus of claim 11, wherein the supply assembly includes a supporting member upon which the rotary plate rest, the supporting member having an opening aligned with another pneumatic device producing a stream of fluid to transfer a shell from a through seat of the rotary plate to a seat of the rotary drum when the through seat and the seat align with the opening.

20. The apparatus of claim 11, wherein the supply assembly includes a gap formed between a cover member and the rotary plate to contain a plurality of the shells.

21. The apparatus of claim 20, wherein the supply assembly includes a wall having a bottom edge, the wall extending from the cover member toward the rotary plate without the bottom edge contacting the rotary plate so that only the shells retained in the through seats move out of the gap.

22. The apparatus of claim 21, wherein said another pneumatic device is a nozzle producing a stream of compressed air.

23. The apparatus of claim 20, wherein the supply assembly includes a sensor to detect the amount of the shells in the gap.

24. The apparatus of claim 23, wherein the sensor is a level sensor.

25. The apparatus of claim 23, wherein the supply assembly includes a hopper to receive a plurality of the shells, the hopper having a throat portion configured to temporarily retain the shells before the shells flow into the gap through a passageway connecting the throat portion and the gap.

26. The apparatus of claim 25, wherein the supply assembly includes another pneumatic device directed toward the throat portion, said another pneumatic device producing pulsating fluid jets to release the shells temporarily retained in the throat portion.

27. The apparatus of claim 26, wherein the supply assembly includes a control unit electrically connected to the sensor and a valve electrically connected to the control unit, the control unit, in response to the sensor detecting a decrease in the amount of shells in the gap, sending a signal to the valve to activate said another pneumatic device to produce the pulsating fluid jets.

28. The apparatus of claim 27, wherein the valve is a solenoid valve.

29. The apparatus of claim 27, wherein said another pneumatic device is a nozzle producing pulsating air jets.

30. The apparatus of claim 20, wherein the supply assembly includes a ring-shaped member extending from the cover member to the rotary plate to further define the gap.

31. The apparatus of claim 30, wherein the ring-shaped member includes a plurality of other pneumatic devices producing a stream of fluid to move the shells in the gap toward the though seats and to assist insertion of the shells into the through seats.

32. The apparatus of claim 31, wherein said other pneumatic devices are nozzles producing a stream of compressed air.

33. The apparatus of claim 11, wherein the rotary plate is a circular plate having the through seats positioned substantially at the periphery thereof.

34. The apparatus of claim 11, wherein the supply assembly includes a plurality of rotary plates of different thicknesses and thereby through seats of different thicknesses, each thickness corresponding to shells of a different dimension to be retained in respective through seats.

35. An assembly for orienting shells of medicinal capsules in a single direction, each shell having a concave inner surface and a convex outer surface, comprising:

a pneumatic device producing a stream of fluid;

a rotary drum having a plurality of seats, each seat being configured to hold a single shell either in a first direction having the concave inner surface facing the pneumatic device or in a second direction having the convex outer surface facing the pneumatic device; and a block including a channel having an inlet and an outlet, the inlet and the pneumatic device being positioned relative to each other such that, only when a seat holding a shell in the first direction aligns with the inlet, the stream of fluid impinges on the concave inner surface and removes the shell from the seat into the inlet, the removed shell being moved through the channel to the outlet where the removed shell is temporarily retained in the second direction to be inserted into the seat when the seat aligns with the outlet, and when a seat holding a shell in the second direction aligns with the inlet of the channel, the shell remains in the seat and is transported only by the rotation of the rotary drum.

* * * * *

UNITED STATES PATENT AND TRADEMARK OFFICE
CERTIFICATE OF CORRECTION

PATENT NO. : 6,189,676 B1  
DATED : February 20, 2001  
INVENTOR(S) : Angelo Ansaloni Page 1 of 1

It is certified that error appears in the above-identified patent and that said Letters Patent is hereby corrected as shown below:

Column 5,  
Line 46, "claim 1" should read -- claim 2 --; and  
Line 56, "claim 4" should read -- claim 6 --.

Signed and Sealed this

Fourteenth Day of May, 2002

Attest:

JAMES E. ROGAN  
*Attesting Officer*   *Director of the United States Patent and Trademark Office*